No. 836,388. PATENTED NOV. 20, 1906.
J. G. KYLE.
ORANGE CLIPPER.
APPLICATION FILED JAN. 30, 1906.

James G. Kyle, Inventor

Witnesses

UNITED STATES PATENT OFFICE.

JAMES G. KYLE, OF RIVERSIDE, CALIFORNIA.

ORANGE-CLIPPER.

No. 836,388.　　　　　　Specification of Letters Patent.　　　　　Patented Nov. 20, 1906.

Application filed January 30, 1906. Serial No. 298,687.

*To all whom it may concern:*

Be it known that I, JAMES G. KYLE, a citizen of the United States, residing at Riverside, in the county of Riverside and State of California, have invented a new and useful Orange-Clipper, of which the following is a specification.

The invention relates to improvements in orange-clippers.

The object of the present invention is to improve the construction of orange-clippers and to provide a simple, inexpensive, and efficient device designed for gathering oranges and other citrus fruit having thick woody stems adhering so firmly to the fruit that the same must be detached from the tree by clipping.

A further object of the invention is to provide a fruit-clipper of this character having means for effectually preventing any possibility of cutting or bruising the rind at either side of the stem in clipping the fruit from the tree.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
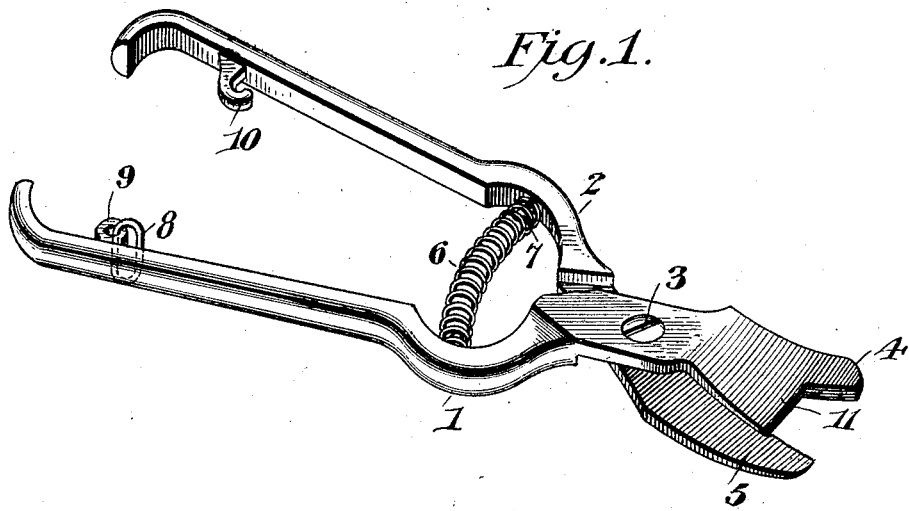
Figure 2:
Figure 3:
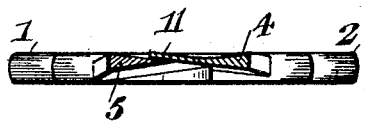
Figure 4:
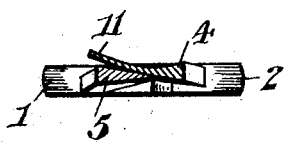

In the drawings, Figure 1 is a perspective view of an orange-clipper constructed in accordance with this invention. Fig. 2 is a side view of the same. Figs. 3 and 4 are transverse sectional views taken substantially on the line 3 3 of Fig. 2 and showing the orange-clipper in its open and closed positions.

Like numerals of reference designate corresponding parts in all the figures of the drawings.

The orange-clipper is composed of two members 1 and 2, pivotally connected by a screw 3 or other suitable fastening device and having inner handle portions and provided with outer jaws or blades 4 and 5. The jaws or blades, which have inner cutting edges, are blunt or rounded at the outer ends and are curved longitudinally to present a concave surface to the fruit. The cutting jaws or blades operate in different planes, and their cutting edges pass each other when the jaws or blades are closed, as illustrated in Fig. 4 of the drawings.

The jaws are opened automatically by means of a coiled spring 6, which is interposed between the bars 1 and 2 at the inner side of the pivot-screw 3, the members 1 and 2 being preferably curved outwardly at the ends of the coiled spring and provided with lugs 7 for supporting the ends of the same. The orange-clipper is operated by compressing the handle portions of the members 1 and 2, and as soon as the same are released the spring automatically opens the jaws or blades. The device may be locked in its closed position by means of a link or loop 8, which is linked into an eye 9 of the member 1 and which is adapted to engage a hook 10 of the member 2. As the manner of mounting the coiled spring and the construction of the locking means do not constitute a portion of this invention, further illustration than that afforded by Fig. 1 of the the drawings is deemed unnecessary.

The device is designed for gathering oranges or other citrus fruit having thick woody stems adhering so firmly to the fruit that the same must be detached from the trees by clipping, and in order to prevent a possibility of cutting or bruising the rind of the fruit on either side of the stem, especially when reaching downward from a ladder, the blade 4 of the member 1 is provided a short distance from its outer end with a transversely-disposed arm or extension 11, forming a combined guard and stop and adapted to prevent either the cutting edges or the outer ends of the blades or jaws from coming in contact with the fruit. The combined guard and stop is substantially triangular and extends from the inner cutting edge of the blade 4 across the space between the jaws to the cutting edge of the jaw or blade 5 when the device is open, as shown in Fig. 1. It is transversely curved at its outer face to present a concave surface to the fruit, and it is adapted to rest upon the same and abut at its outer transverse edge against the stem. It will support the cutting edges of the jaws or blades out of contact with the fruit, and its outer end engages the stem of the fruit and forms a stop to prevent the outer ends of the cutting blades or jaws from projecting beyond the stem a sufficient distance to come in contact with the fruit and cut or bruise the rind.

It will be seen that the combined guard and stop, which is adapted to rest upon the fruit, forms a simple and efficient means for preventing both the cutting edges of the jaws or blades and the outer ends of the same from coming in contact with and cutting or bruising the rind at either side of the stem.

The triangular guard closes the entire space between the jaws in rear of the short cutting edges when the device is open, and it effectually prevents leaves or trash from getting into the joint and interfering with the operation of the device. In the operation of cutting the jaw 5 moves over the triangular arm and does not rub against the fruit, as would be the case were the arm not employed.

Having thus fully described my invention, what I claim as new, and desire to secure by Letters Patent, is—

1. A fruit-clipper of the class described, comprising a pair of pivoted members provided with jaws or blades curved longitudinally and having short cutting edges, and a combined guard and stop consisting of a transversely-disposed arm or extension curved transversely of the blades and formed integral with one of the same and arranged at an angle to the other blade, when the fruit-clipper is closed and having a concave outer face arranged to rest upon the fruit to support the cutting edges of both of the blades out of contact with the same, said arm having a blunt front end from which the short cutting edges of the blades extend, and which is adapted to abut against the stem of the fruit, whereby the combined guard and stop is also adapted to prevent the outer ends of the jaws or blades from coming in contact with the rind of the fruit.

2. A fruit-clipper of the class described, comprising a pair of pivoted members provided with jaws or blades having short cutting edges, and a combined guard and stop consisting of a triangular arm extending from the short cutting edge of one of the jaws or blades to the inner end thereof, and entirely closing the space between the jaws or blades in rear of the short cutting edges when the device is open, to exclude leaves and trash from the joint and prevent them from interfering with the operation of the device, said triangular arm being curved transversely and formed integral with one of the jaws or blades, and arranged at an angle to the other jaw or blade, the latter moving over the arm in the operation of the device and being prevented by the said arm from rubbing against the fruit.

In testimony that I claim the foregoing as my own I have hereto affixed my signature in the presence of two witnesses.

JAMES G. KYLE.

Witnesses:
   FRANK C. NOBLE,
   WILLIAM G. RANDALL.